United States Patent

Barabas et al.

[15] 3,691,125

[45] Sept. 12, 1972

[54] STABLE AQUEOUS EMULSIONS

[72] Inventors: Eugene S. Barabas, Watchung; Marvin M. Fein, Westfield, both of N.J.

[73] Assignee: GAF Corporation, New York, N.Y.

[22] Filed: May 4, 1970

[21] Appl. No.: 34,570

[52] U.S. Cl. .260/29.6 WB, 260/29.6 RW, 260/85.7, 260/875, 260/895
[51] Int. Cl. ............................C08f 1/13, C08f 19/00
[58] Field of Search ......260/29.6 RW, 29.6 WB, 875

[56] References Cited

UNITED STATES PATENTS

| | | |
|---|---|---|
| 2,890,199 | 6/1959 | McNulty et al. ............260/45.5 |
| 3,053,801 | 9/1962 | Bingham et al. ............260/45.5 |
| 3,402,987 | 9/1968 | Dalton et al. .....................8/31 |
| 3,488,312 | 1/1970 | Barabas et al. ............260/29.6 |
| 3,244,658 | 4/1966 | Grosser et al. ............260/29.6 |

*Primary Examiner*—William H. Short
*Assistant Examiner*—E. Nielsen
*Attorney*—Samson B. Leavitt, Stephen J. Baron and Walter C. Kehm

EXEMPLARY CLAIM

1. An emulsion copolymerization process for producing an aqueous emulsion comprising copolymerization of approximately by weight 1–99 parts of an N-vinyl lactam and 99 to 1 parts of a vinyl ester having the formula

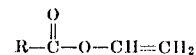

wherein R is $C_{1-18}$ alkyl, in an aqueous medium having a total solids content by weight of about 40 to 60% and containing as seeding agent 5–20% polymeric N-vinyl lactam based on the amount of said N-vinyl lactam.

7 Claims, No Drawings

STABLE AQUEOUS EMULSIONS

The present invention relates in general to stable aqueous emulsions and more particularly to stable aqueous emulsions comprising copolymers of N-vinyl lactams and vinyl esters and a process for the preparation of such copolymers.

Film forming emulsion compositions comprising copolymers of N-vinyl lactams and vinyl esters are well known in the art. These products are generally prepared either in bulk or in organic solvents or in aqueous dispersions, the latter procedure, of course, resulting in emulsion products. These emulsion processes are well known and generally comprise reacting the vinyl esters and the N-vinyl lactams in an aqueous solution in the presence of an emulsifying or dispersing agent to produce emulsions or latices of the copolymers.

The interpolymer products which have been produced by these prior processes, while exhibiting utility as cast films or as film forming emulsion compositions, have yet to achieve significant value as the properties of the resultant copolymer products tend to fluctuate over a wide area. One of the most significant defects of these copolymers has been that the viscosity of the products is subject to wide variances where consistency is often at a premium. This of course renders film casting employing such products of dubious utility as the properties of the copolymer product cannot be safely predicted.

It is clear therefore that a need has long existed in the art for a process which could produce copolymers of N-vinyl lactams and vinyl esters, wherein the polymeric products exhibit controlled viscosities.

It is accordingly one object of the present invention to provide a novel process for the production of novel copolymers of N-vinyl lactams and vinyl esters.

It is a further object of the present invention to provide a novel process for the production of copolymers of N-vinyl lactams and vinyl esters which products exhibit controlled viscosities not known heretofore in the art.

A still further object of the invention is to provide a new and improved process for the production of copolymers of N-vinyl lactams and vinyl esters whereby the products produced by the process are capable of exhibiting consistent viscosity values and therefore form cast films of uniform properties.

Still other objects and advantages of the present invention will become further apparent as the description thereof proceeds.

In accordance with the above defined objects and advantages, methods have been devised according to this invention whereby stable aqueous emulsions or latices comprising copolymers of N-vinyllactams and vinyl esters are produced which emulsion products show controlled viscosity values.

As a result of the invention upon which the present discovery is based, the novel copolymers are produced by a process which comprises copolymerizing a mixture of an N-vinyllactam and a vinyl ester in the presence of a polymeric N-vinyllactam.

It has now been discovered that the copolymerization of a mixture of an N-vinyllactam and a vinyl ester may be carried out in the presence of a polymeric N-vinyllactam, which polymeric N-vinyllactam is present at the seeding stage of the polymerization process, the process resulting in the production of stable aqueous dispersions or latices containing hard synthetic polymers having novel and unexpected properties.

The N-vinyllactams utilized in the preparation of the compositions of this invention are characterized by the following general structural formula:

I. 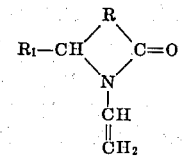

wherein R represents an alkylene bridge necessary to complete a five, six or seven membered heterocyclic ring system and $R_1$ represents a member selected from the group consisting of hydrogen, alkyl, aryl, alkaryl and aralkyl groups. Each of these specific N-vinyl lactams characterized by the foregoing general formula is commercially available.

Of the N-vinyl lactams described hereinabove, the preferred material for use in forming the copolymers of this invention comprises N-vinyl-2-pyrrolidone and 5-methyl-N-vinyl-2-pyrrolidone.

The vinyl esters employed as starting materials in the process of this invention are those of the following general structural formula:

II. 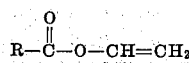

wherein R is an alkyl group containing about one to 18 carbon atoms and preferably containing one to seven carbon atoms. A preferred reactant material falling within this group is vinyl acetate.

As pointed out hereinabove, the starting materials are copolymerized in the presence of a polymeric N-vinyl lactam preferably one corresponding to the particular monomeric N-vinyl lactam chosen as one of the primary starting materials. These polymeric products may be characterized by the following general formula:

III. 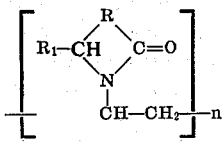

wherein R represents an alkylene bridge group necessary to complete a 5-, 6- or 7-membered heterocyclic ring system, $R_1$ represents a member selected from the group consisting of hydrogen, alkyl, aryl, alkaryl and aralkyl groups, preferably hydrogen, and n represents a number indicative of the extent of polymerization. All of the specific polymeric materials characterized by the foregoing general Formula III are commercially available and are called polymeric N-vinyllactams. In accordance with the preferred monomeric lactams, the preferred polymer for use in the process is poly-N-vinyl-2-pyrrolidone.

These polymeric materials may be obtained by polymerizing the monomeric N-vinyllactams identified hereinabove in Formula I such as for example, N-vinyl-2-pyrrolidone or N-vinyl-5-methyl-2-pyrrolidone and the like. Depending upon the extent of polymerization, these materials have molecular weights ranging from at least 400 up to 2,000,000 or more. In actual practice, a mixture of polymeric molecules each containing a different number (n) of monomer units is always produced in forming the polymers.

According to the method of this invention, it has been found that copolymerization of a mixture of the aforesaid monomers in the presence of a polymeric N-vinyl lactam results in the formation of copolymeric products having novel and unexpected properties. According to the invention it is essential that the polymeric N-vinyl lactam material be present at the seeding stage of the polymerization as this technique is believed to change the ordinary mechanism of the copolymerization reaction. While not wishing to be bound by any particular theory or mechanism of reaction, it is believed that with the polymeric N-vinyl lactam present at the seeding stage of polymerization, the reaction starts on the surface of the polymer and the newly developed chains grow into the water phase thereof. This is in contradistinction to prior emulsion copolymerizations of vinyl esters and N-vinyl lactams carried out by conventional methods wherein both the initiation and the propagation steps take place in the organic phase. Thus, the products produced by the process of the invention are believed to constitute an arrangement of the polymer units not known heretofore.

The polymers produced in the process of the invention are obtained in the form of emulsions of dispersion which have controlled or consistent viscosities. This controlled viscosity is present as different batches of the copolymers are produced and constitutes a distinct improvement over products produced heretofore by conventional methods wherein the product viscosities are subject to wide variations.

As pointed out hereinabove the reaction is carried out in the presence of a free radical initiator. These initiators or catalysts are well known in the art and generally comprise systems which yield free radicals under the conditions of the reaction. For example, such compounds as organic and inorganic peroxides may be employed as it has been found that such products yield free radicals under the conditions employed in the reaction. These materials include, for example, benzoyl peroxide, cumene hydroperoxide, hydrogen peroxide, acetyl peroxide, lauroyl peroxide, persulfates such as alkali metal persulfates, including sodium and potassium persulfates. Also included are perborates such as sodium, potassium and ammonium perborate as well as a class of compounds referred to as azobisnitriles which may be represented by azobis-isobutyronitrile. If desired mixtures of these catalysts can be employed. The preferred catalyst for conducting the reaction is azobis-isobutyronitrile, the latter compound referred to above.

The catalyst concentration employed in the reaction system is not necessarily a critical feature of the invention as the amount thereof can be varied over a wide range but advantageously an amount of catalyst varying from about 0.01 to 2.0 weight percent or more is preferably employed based on the total weight of the reactants being polymerized.

The temperature at which the invention is advantageously carried out can be varied over a range of from about 75° C. to about 95° C. However, it is preferred to conduct the polymerization reaction at a temperature between about 80° to 85° C. to provide products having the desirable physical characteristics of latex viscosity and molecular weight.

The polymerization reaction is preferably carried out in the absence of free oxygen as it has been found that the presence of free oxygen is detrimental to the process of the invention. Also, it has been found to be advantageous to conduct the process under a blanket of an inert gas such as nitrogen, argon and the like.

In general the reactants may be employed in the polymerization process in any ratio desired, as the amount of each material employed will of course serve to determine the constitution and properties of the finally obtained polymeric product. It is preferred, however, to employ about 1 to 99 parts by weight of the polymeric N-vinyl lactam to about 99 to 1 parts by weight of the monomeric N-vinyl lactam with a corresponding amount of the vinyl ester. It is, of course, obvious that these amounts may be varied depending on the properties of the desired polymer to be produced.

The polymerization is carried out preferably by agitating the emulsion containing the reactants at the specified temperatures for a time sufficient for a predominant amount of the monomeric material to be converted into resinous polymers. The process generally requires about 6 to 12 hours, although this period will vary depending upon the starting materials and the specific conditions of the process.

If desired additional materials may be added to the reaction mixture including activating agents such as alkali metal sulfites or bisulfites in about the same amounts as the polymerization catalyst or initiator, in which case lower polymerization temperatures may be used. Also, it is within the scope of the invention to employ chain regulators such as hexyl, cetyl, dodecyl, etc., mercaptans in the polymerization reaction. Moreover, suitable surface active agents such as fatty acid soaps and fatty alcohol sulfates may be employed in the reaction.

The products obtained as a result of the polymerization reaction, when proceeding in the manner described hereinbefore, are in the form of fluid milk-white, latex-like dispersions and exhibit controlled viscosity when cast upon a substrate.

The emulsion can be compounded with additives such as pigments, salts, wetting agents, resins, waxes and the like, thus providing a wide spectrum of products having varied industrial applications.

The following examples will serve to illustrate the practice of the invention.

EXAMPLE 1

The apparatus employed for carrying out this example comprised a one-liter resin kettle equipped with mechanical stirrer, reflux condenser, dropping funnel, gas inlet tube and thermometer.

339.5 Parts of distilled water was charged to the flask, and 5 parts of poly-N-vinyl-2-pyrrolidone (K–30) was added thereto and the mixture stirred until a clear solution was obtained. Thereafter a mixture of 128.5 parts of vinyl acetate and 93.7 parts of N-vinyl-2-pyrrolidone was added in one batch. The system was then purged with nitrogen gas thoroughly and heated to 65° C. Then 0.345 parts azobis-isobutyronitrile was introduced and the temperature was raised to a gentle reflux, the reflux period starting at about 70° C. After 2 hours of reaction at this temperature, 0.138 parts of azobis-isobutyronitrile was added and the temperature was raised to 80° to 85° C. in order to maintain the reflux of the mixture. This temperature range was maintained for two more hours whereupon an additional 0.138 parts of azobis-isobutyronitrile was added and the reaction was continued until all the monomers were consumed. Thereafter, the mixture was cooled to room temperature and the resultant latex filtered through cheesecloth.

The latex obtained from this reaction was milk-white in color and much less viscous than such products obtained by prior processes.

The analytical results of this experiment are as follows:

| Total Solids, % | = | 40.0 |
| Coagulum, % | = | none |
| Residual Monomer, % | = | 0.31 |
| Conversion, % | = | 99.2 |
| K Value | = | 79.0 |
| Brookfield Visc. (cps) | = | 14,700 |

In order to determine the controlled viscosity and consistency of the process of the invention, 12 additional experiments were carried out exactly as that of Example 1. In these runs, polymeric products were obtained having Brookfield Viscosity values ranging from 13,200 to 14,700 cps.

To contrast these results, the identical experiments were carried out in the absence of the polyvinyl pyrrolidone. The polymerized products obtained from these latter reactions exhibited Brookfield Viscosity values ranging from 6,000 to 48,000 cps.

EXAMPLE 2

The reaction apparatus employed in this experiment was the same as in Example 1.

339.5 Parts of distilled water was placed in the reaction flask, 14.8 parts of poly-N-vinyl-2-pyrrolidone was added thereto and the mixture was stirred until a clear solution was obtained. Thereafter, a mixture of 83.9 parts of N-vinyl-2-pyrrolidone and 128.5 parts of vinyl acetate was added in one batch. The azobis-isobutyronitrile catalyst was added in small increments as in the previous example as the remainder of the experiment was carried out exactly as described in Example 1.

The analytical results of this experiment are as follows:

| Total Solids, % | = 39.5 |
| Coagulum, % | = none |
| Residual Monomer, % | = 0.11 |
| Conversion, % | = 99.8 |
| K Value, % | = 77.7 |
| Brookfield Visc. (cps) | = 4060 |

EXAMPLE 3

The reaction apparatus employed in this experiment was the same as in Example 1.

339.5 Parts of distilled water was placed in the reaction flask, 10.0 parts of poly-N-vinyl-2-pyrrolidone was added thereto and the mixture was stirred until a clear solution was obtained. Thereafter, a mixture of 76.4 parts of N-vinyl-5-methyl-2-pyrrolidone and 128.5 parts of vinyl acetate was added in one batch. The azobis-isobutyronitrile catalyst was added in small increments and the remainder of the experiment was carried out exactly as described in Example 1. The analytical results of this experiment are as follows:

| Total Solids, % | = 39.5 |
| Coagulum, % | = .0 |
| Residual Monomer, % | = 0.23 |
| Present Conversion, % | = 99.4 |
| K Value, % | = 79 |
| Brookfield Viscosity | = 1275 |

In a similar manner other copolymers of the class described hereinabove can be employed in place of the specific reactants employed in the examples with similar results attending.

Reference in the specification and claims to parts, proportions and percentages unless otherwise specified refer to parts, proportions and percentages by weight.

It is obvious that numerous changes and modifications can be made in the above described details without departing from the spirit and nature of the invention. Therefore, it is to be understood that any such changes and modifications are included within the scope of the invention and that the invention is not to be limited except as set forth in the appended claims.

What is claimed is:

1. An emulsion copolymerization process for producing an aqueous emulsion comprising copolymerization of approximately by weight 1–99 parts of an N-vinyl lactam and 99 to 1 parts of a vinyl ester having the formula

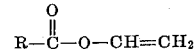

wherein R is $C_{1-18}$ alkyl, in an aqueous medium having a total solids content by weight of about 40 to 60 percent and containing as seeding agent 5–20 percent polymeric N-vinyl lactam based on the amount of said N-vinyl lactam.

2. A process according to claim 1 wherein the monomers to be polymerized are N-vinyl-2-pyrrolidone and vinyl acetate and the process is carried out in the presence of poly-N-vinyl-2-pyrrolidone as seeding agent.

3. A process according to claim 1 wherein the monomers to be polymerized are N-vinyl-5-methyl-2-pyrrolidone and vinyl acetate and the process is carried out in the presence of poly-N-vinyl-2-pyrrolidone as seeding agent.

4. A process according to claim 1 wherein the reaction is carried out at a temperature of about 75° C. to about 95° C.

5. A process according to claim 4 wherein the reaction is carried out in the presence of a free-radical initiator.

6. A process according to claim 4 wherein the reaction is carried out in the presence of an inert gas.

7. A process according to claim 1 wherein said polymeric N-vinyl lactam corresponds to a homopolymer of said monomeric N-vinyl lactam.

* * * * *